United States Patent
Jones, II

(10) Patent No.: US 6,869,285 B1
(45) Date of Patent: Mar. 22, 2005

(54) TRAINING FIREARM

(76) Inventor: Charles R Jones, II, 3201 Belmont Cir., Edmond, OK (US) 73034

( * ) Notice: Subject to any disclaimer, the term of this patent is extended or adjusted under 35 U.S.C. 154(b) by 0 days.

(21) Appl. No.: 10/459,219

(22) Filed: Jun. 11, 2003

(51) Int. Cl.[7] .............................................. G09B 19/00
(52) U.S. Cl. ............................................. 434/16; 42/10
(58) Field of Search ............................. 434/11, 16, 18, 434/17, 19, 20, 21, 22, 23, 24; 42/5, 10–12, 39.5, 42.03, 43, 70.08

(56) References Cited

U.S. PATENT DOCUMENTS

| | | |
|---|---|---|
| 2,023,497 A | 12/1935 | Trammell |
| 2,940,438 A | 6/1960 | Merz |
| 3,127,885 A | 4/1964 | Kline et al. |
| 3,527,194 A | 9/1970 | Vadas et al. |
| 3,824,981 A | 7/1974 | Crane et al. |
| 4,015,512 A * | 4/1977 | Feerick .......................... 89/190 |
| 4,302,190 A | 11/1981 | Shaw et al. |
| 4,380,437 A | 4/1983 | Yarborough, Jr. |
| 4,480,999 A | 11/1984 | Witherell et al. |
| 4,521,195 A | 6/1985 | Moberg |
| 5,233,776 A | 8/1993 | Hessey |
| 5,363,834 A | 11/1994 | Stuchlik |
| 5,622,160 A | 4/1997 | Casas Salva |
| 5,664,552 A | 9/1997 | Kunimoto |
| 5,711,286 A | 1/1998 | Petrosyan et al. |
| 5,947,738 A * | 9/1999 | Muehle et al. ................. 434/16 |
| 6,146,141 A | 11/2000 | Schumann |
| 6,322,365 B1 | 11/2001 | Shechter et al. |
| 6,494,194 B2 | 12/2002 | Shipachev et al. |

* cited by examiner

Primary Examiner—Kim Nguyen
(74) Attorney, Agent, or Firm—Mary M. Lee

(57) ABSTRACT

A training firearm that provides a realistic recoil effect. The firearm, preferably a pistol, may be an actual firearm retrofitted with a self-contained "blow back" assembly. Usually, the pistol will include a laser device that emits a laser beam readable by a target system. The laser replaces live rounds, and the blow back assembly causes return of the slide to cycle in a manner similar to that caused by live ammunition in an unmodified weapon. The blow back assembly is driven by a disposable cartridge of compressed gas self-contained in the handle of the pistol. A valve integrated with the firing pin releases a burst of gas when the firing pin is impacted by the hammer. The gas pushes back the slide and recocks the hammer for the next "round." This system provides law enforcement and military personnel a realistic tool to develop recoil management and target re-acquisition skills.

24 Claims, 4 Drawing Sheets

TRAINING FIREARM

FIELD OF THE INVENTION

The present invention generally relates to training firearms and, more particularly, to training firearms that generate a realistic recoil effect without using live ammunition.

BACKGROUND OF THE INVENTION

Law enforcement officers and many military personnel are trained and retested regularly for appropriate and accurate use of firearms in the line of duty. Various training systems are available. In most of these training systems, the officer is exposed to a series of mock scenarios represented on movie screens. The officer must make instantaneous decisions regarding when, where and whom to shoot as he moves through the course.

The handguns used during these exercises are not loaded with live ammunition. Rather, in most of these systems, a laser device of some sort is installed in the barrel. When the trigger is pulled, a laser beam is emitted from the barrel instead of a bullet. The screens and targets have laser-sensitive screens so that, when the laser beam hits the screen, a "hit" is recorded usually in a computer system. In this way, the officer's performance can be recorded and reviewed later for evaluation.

To accurately train and test the officer's performance, it is important that the conditions in the training facility closely simulate field conditions where live ammunition is being fired. In particular, it is important to recreate as realistically as possible the way a loaded handgun operates, including the recoil force of the gun while firing repeatedly. However, if only a laser is used in the weapon, there is no reverse impact generated with the weapon is "fired." This deprives the trainee of critical experience in recoil management and target re-acquisition.

The unrealistic feel of a laser-modified training firearm has led to attempts to provide a training firearm with realistic recoil. An authentic automatic or semi-automatic handgun cycles or re-cocks itself automatically after the first round is fired. As each round is fired, the explosive impact of the bullet not only propels the bullet out of the barrel but pushes the slide assembly back to recock the hammer. The firing chamber is simultaneously reloaded. Thus, the gun can be fired repeatedly until the magazine is emptied without ever having to pull back the slide assembly or manually cock the hammer. However, the recoil force is significant, and novice shooters will be distracted by it until they become accustomed to it. The trainee must learn to recover quickly from the impact of the recoil and immediately to realign the gun sight for the next shot.

Various methods have been employed to cause the laser-modified training weapons to provide simulated recoil. Some of these include the use of compressed gas, usually $CO_2$. In some cases, the compressed gas is supplied by a portable tank carried on the officer's back. In others, the gas is stored in a remote tank and supplied to the firearm through a flexible conduit connected to the weapon. However, in both these systems, the weapon is unnaturally tethered. This substantially affects the way the officer carries himself and handles his weapon, and significantly detracts from the reality of the experience.

Another method in the prior art to simulate live fire in a handgun is an "air" bullet. This is a bullet casing loaded with compressed gas, which discharges and cycles the weapon when the gun is fired much like a live round. These air bullets function well enough but are expensive and must be used within a few minutes of air injection or they will lose their charge. In addition, the spent shells are not disposable; they are retrieved and recharged.

There is a need for a training firearm that utilizes a laser "firing" device and yet provides realistic recoil without encumbering the trainee with extra equipment. There is a need for a recoil system that can be retrofitted in a wide variety of actual firearms so that the training experience is as close as possible to field experience with the same type of firearm. There is a need for a training firearm with a recoil system powered by inexpensive, disposable compressed gas cylinders. There is a need for a training firearm which avoids clean up and recharging of spent shells. There is a need for a training firearm the looks, feels and operates like an actual firearm. There is a need for a training firearm that can be used inexpensively for dry firing experience.

SUMMARY OF THE INVENTION

The present invention comprises a training firearm comprising a receiver. A barrel is supported on the receiver, and a slide is slidably mounted relative to the barrel for bidirectional forward and rearward movement relative to the receiver. A firing pin is included behind the barrel. The firing pin is mounted for movement between a retracted position and a firing position.

Also included in the training firearm is a firing assembly. The firing assembly includes a driver movable between a cocked position and a firing position. In the firing position, the driver is adapted to impact the firing pin propulsively. In the cocked position, the driver is held in biased condition in preparation for release. The firing assembly further comprises a trigger adapted to release the driver. The slide is adapted to recock the driver when it moves bidirectionally.

Still further, the training firearm includes a blow back assembly interposed between the barrel and the firing pin. The blow back assembly comprises a tube defining an external pressure chamber, and a housing defining an internal pressure chamber. The housing is movably received in the tube and has a valve opening fluidly connecting the internal pressure chamber with external pressure chamber. A closure member is movable in the housing between an open position in which the valve opening is open and a closed position in which the valve opening is closed. The closure member is adapted to move in response to advancement of the firing pin.

A compartment is provided inside the firearm, the compartment being adapted to contain a compressed gas cartridge. The training firearm also has a conduit adapted to fluidly connect the internal pressure chamber to a compressed gas cartridge in the compartment.

Either the tube or the housing is fixed relative to either the receiver or the slide, and the other one of the tube and the housing is fixed relative to the other one of the receiver and the slide. Thus, when a compressed gas cartridge is installed in the compartment, activation of the trigger causes the slide to move rearwardly recocking the firearm.

DETAILED DESCRIPTION OF THE PREFERRED EMBODIMENT

Figure 1:
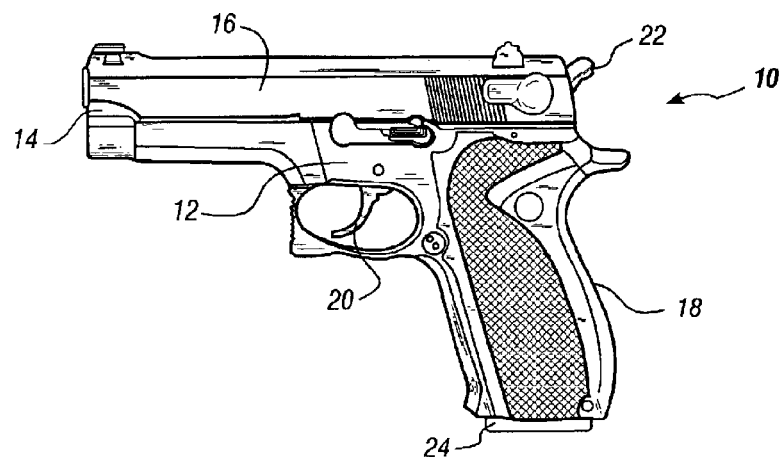
FIG. 1 is a side elevational view of a popular 9 mm semi-automatic pistol.

With reference now to the drawings in general and to FIG. 1 in particular, there is shown therein a 9 mm semi-automatic pistol, specifically a 1999 5900 Series Smith & Wesson. The pistol is designated generally by the reference numeral 10. As the structure and function of this type of pistol is well known, it will not be described in detail herein. Generally, such a pistol 10 comprises a frame or receiver 12 which supports the other components. The other main components include a barrel 14, a slide assembly 16, a grip 18, a trigger 20, and a hammer 22. A magazine 24 is received inside the handle 18.

In use of the pistol 10, the hammer 22 first is cocked either by retracting the slide 16 or manually pulling back on the hammer. Then, when the trigger 29 is pulled, it releases the hammer which impacts the firing pin, driving it forward. When the firing pin hits the primer on the back of the bullet cartridge, the propellant in the casing ignites, forcing the bullet out of the barrel and, at the same time, pushing the slide 16 back over the hammer 22 recocking it. Simultaneously, the empty casing is ejected, and a new round is moved up from the magazine 24 into the firing chamber.

Figure 2:
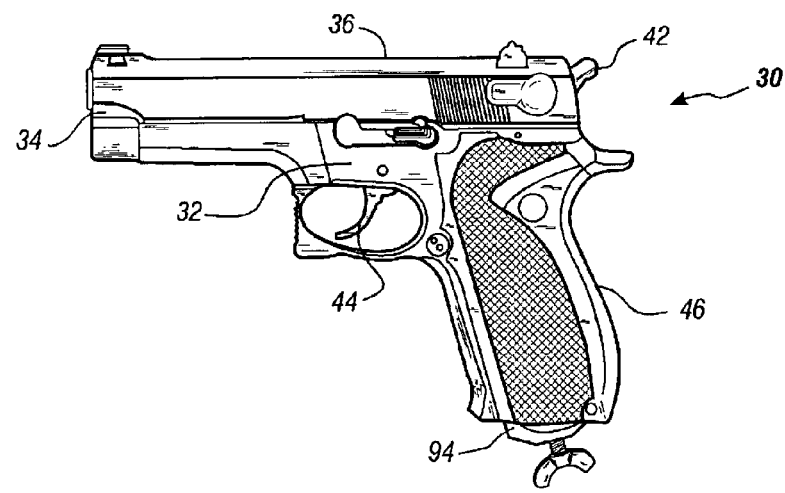
FIG. 2 is a side elevational view of a training pistol made in accordance with the present invention, illustrating how similar to the authentic weapon the inventive weapon is.

Shown in FIG. 2 is a training firearm constructed in accordance with a preferred embodiment of the present invention and designated generally by the reference numeral 30. As the drawings illustrate, the appearance of the training firearm 30 is virtually identical to the actual weapon 10 it is intended to replace. Indeed, as will be described hereafter, in the preferred practice of this invention, an actual firearm is merely modified in accordance with this invention by retrofitting it with the blow back assembly.

While the present invention is illustrated as a Smith & Wesson 9 millimeter pistol particularly popular with law enforcement, the present invention is not so limited. As will become apparent, the invention is easily adapted to a wide range of firearms, including other types of semi-automatic pistols (double and single action). In addition, gas-operated weapons, such as AR 15 type weapons, MP-5's and P-90's may be modified in accordance with this invention. Still further, pump shotguns, such as REM 870 pump riot guns, can be modified to incorporate the recoil system of this invention.

Figure 3:
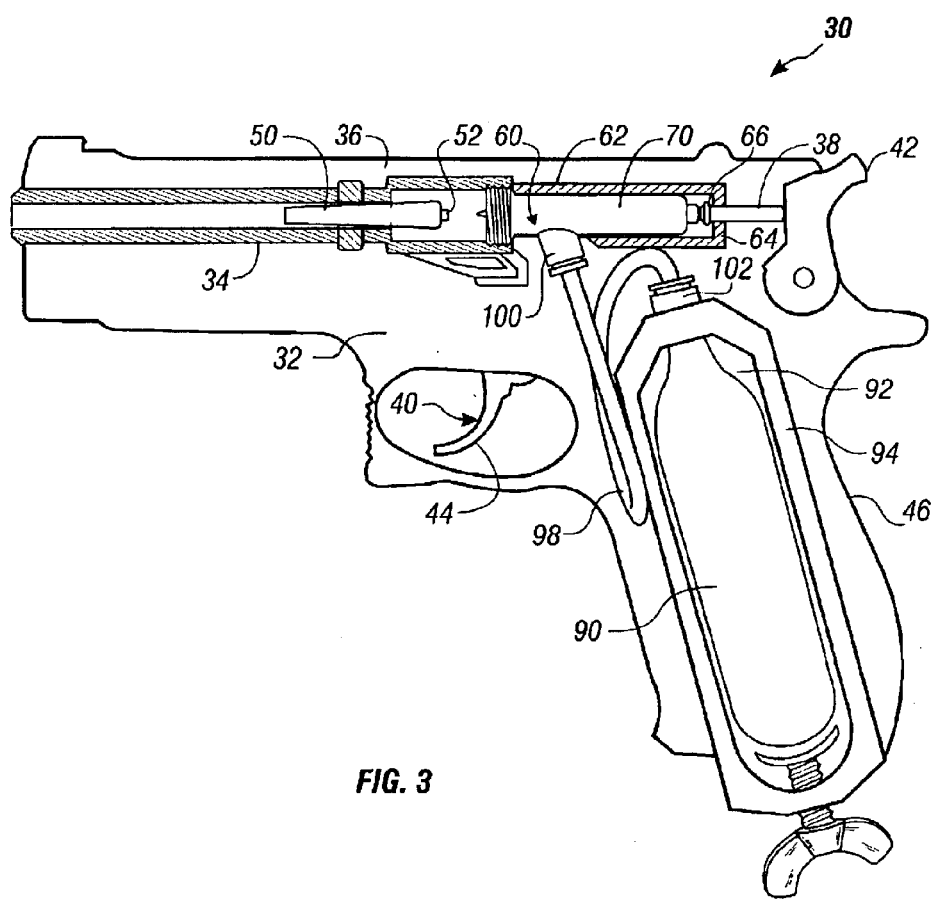
FIG. 3 is a side elevational, partly sectional and cutaway view of the pistol shown in FIG. 2.

With reference now also to FIG. 3, the preferred training firearm 30 will be described in more detail. Like the original pistol, the training pistol 30 comprises a receiver 32 that forms the main structure of the weapon. A barrel 34 is supported on the receiver 32, as in the authentic pistol. A slide 36 is slidably mounted on the receiver over the barrel 34 for bidirectional movement forwardly and rearwardly relative to the receiver 32.

In this preferred training pistol 30, there is a firing pin 38, but it is substantially shorter than in the comparable, unmodified pistol. The firing pin 38 is mounted in the receiver for movement between a retracted position and a firing position, which will be explained in more detail below.

The pistol 30 also includes a firing assembly 40, which may vary widely depending on the firearm. Generally, the firing assembly comprises a driver and a trigger. The driver is movable between a cocked position and firing position. In the firing position, the driver is adapted to impact the firing pin propulsively. That is, the driver is designed to impact the firing pin with sufficient force and speed to activate the primer in the bullet cartridge. In the cocked position, the driver is held in biased condition in preparation for release by the trigger. The trigger is adapted to release the driver when pulled or activated in the normal fashion by the operator of the weapon. Thus, provides a training firearm that looks, feels and functions like the unmodified firearm.

Where the firearm is a semi-automatic pistol, as shown and described herein, the firing assembly 40 comprising a hammer 42 and a trigger 44, which function as the corresponding components do in the original weapon. Accordingly, no detailed description will be provided herein. Similarly, the slide 36 in this preferred embodiment is adapted to recock the hammer 42, or other driver, when the slide is pushed back rearwardly either manually or automatically during repeated "firing" of the weapon. As used herein, "slide" denotes the corresponding component in any automatic or semi-automatic weapon, such as the bolt in a semi-automatic rifle.

The firearm 30 preferably comprises a handle 46 depending from the receiver 32.

As mentioned above, training firearms typically are provided with a laser device of some sort that is interactive with other components in a larger system, such as a laser-sensitive screen and a computer for recording, analyzing and playing back the officer's performance on the course. To that end, the training pistol 30 of the present invention, preferably is equipped with a suitable laser assembly 50 in a known manner. This laser assembly 50 may take a variety of forms, depending on the particular training system employed. Some laser devices are activated by the vibration in the weapon when the trigger is pulled. Others utilize an electronic switch. For purposes of illustrating this training firearm, a laser with a simple mechanical switch 52 is shown. Activation of this switch may be accomplished by the blow black assembly, yet to be described.

Referring still to FIG. 3, the training firearm 30 is provided with a blow back assembly 60 interposed between the barrel 34 and the firing pin 38. The blow back assembly 60 is adapted to cycle the slide 36 in response to activation of the trigger 44, as in the unmodified weapon. Preferably, the blow back assembly 60 comprises a tube 62 that defines an external pressure chamber 64. In the embodiment illustrated herein, the tube is fixed inside the rear of the slide 36. More preferably, the tube 62 has a closed rear end 66 with a firing pin passage 68 therethrough.

When retrofitting an authentic pistol, a cylindrically shaped recess is reamed into the rear of the slide. A cylinder is fixed inside this recess with a suitable bedding compound, such as a two-part epoxy, although other fixation methods will be apparent. The firing pin is shortened to form the firing pin 38 with a forward end 70. The firing pin 38 and passage 68 in the tube 62 are sized to permit reciprocal movement of the pin in the passage for a reason which will become apparent. It should be noted that, though the tube 62 is shown cylindrical in shape, this configuration is not essential and will vary with shape of other cooperating components.

Figure 4:
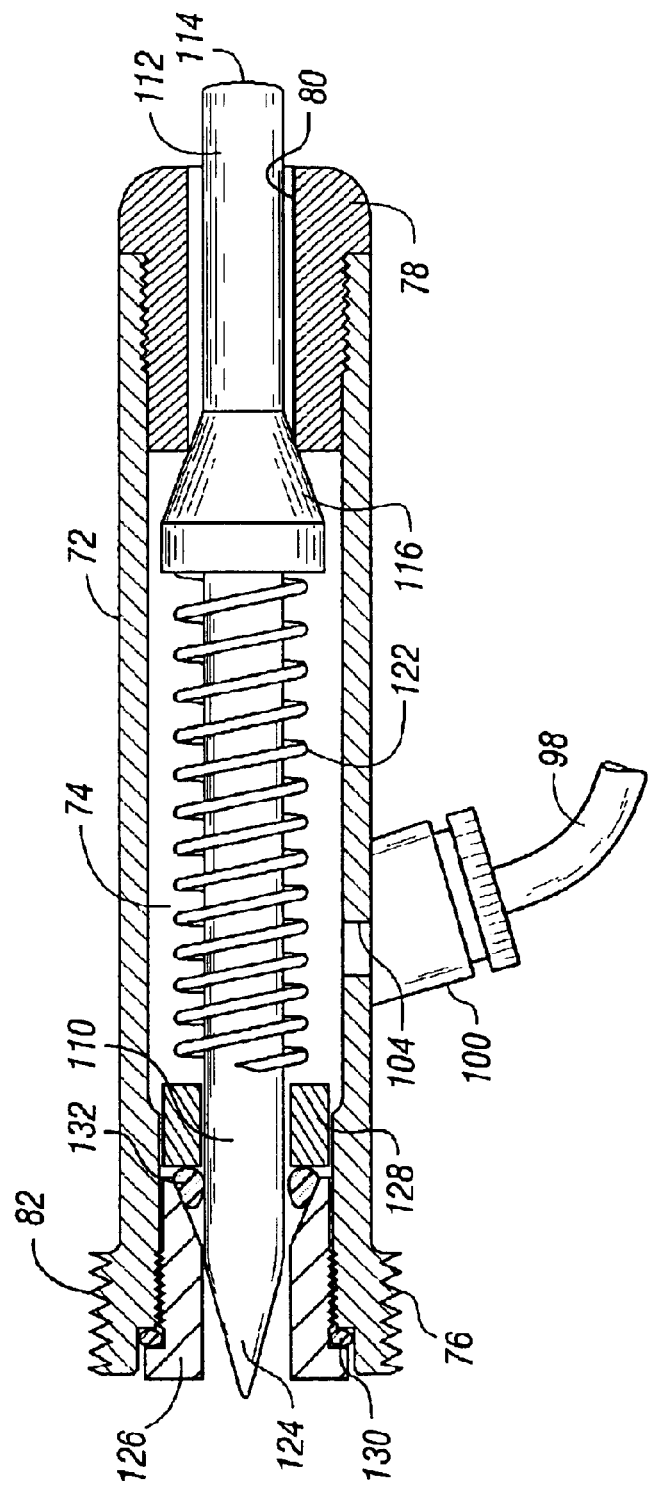
FIG. 4 is an enlarged partly sectional view of the valve housing of the blow back assembly.

Referring still to FIG. 3 and now also to FIG. 4, the blow back assembly 60 may also include a housing 72 defining an internal pressure chamber 74. The housing 72 is sized to be movable, preferably telescopically movable, in the tube 62.

In the preferred form, the housing 72 has a first or front end 76 and a second or rear end 78. A valve opening 80 is formed in the rear end 78. The valve opening 80 fluidly connects the internal pressure chamber 74 in the housing 72 with the external pressure chamber 64 in the tube 62. In this embodiment, where the tube 62 is fixed to the moving slide 36, the housing 72 preferably is fixed relative to the receiver 32, and more preferably is fixed to the barrel 34 and aligned therewith. To that end, the housing 72 is provided with external threads 82 on its front end 76 to mate with internal threads 84 (FIGS. 5A and 5B) on the breech end of the barrel 34.

It will be apparent now that the preferred placement of the valve housing 72 is generally aligned between the firing pin 38 and the barrel 34 generally in the position of what would be the firing chamber in the unmodified pistol. It will also be appreciated that there are other ways to mount the housing 72 in this position. For example, the housing 72 could be fixed to the top of the gas cartridge frame 94, eliminating the need to thread the barrel breech of the forward end of the housing. These and other configurations are contemplated by the present invention.

The housing 72 conveniently may be formed of brass tubing. Preferably, the rear end 78 of the housing 72 is formed of nylon, and may take the form of a firing pin breech plug that is threadedly received in the brass tubing.

With continuing reference to FIG. 3, the blow black assembly 60 includes a compartment contained somewhere within the weapon to contain a cartridge of compressed gas. The gas is used to drive the valve movement, as will be explained. Preferably, the cartridges to be used with the present invention are commercially available cartridges of 12 gm carbon dioxide ($CO_2$), such as the cartridge 90 show in FIG. 3. These cartridges are widely available, inexpensive and disposable. Where the firearm is a hand gun or pistol with a grip, such as the handle 46, the gas cartridge compartment may be advantageously placed inside the handle. When retrofitting an existing weapon, the magazine well provides an ideal compartment 92 for the gas cartridge 90. A frame 94 of some sort for supporting the cartridge may be installed in the magazine well after the magazine is removed. The grip panels of the handle 46 may be perforated to prevent ice build-up around the cartridge 90.

A conduit 98 is included to fluidly connect the internal chamber 74 in the housing 72 with the gas cartridge 90. Preferably, the conduit 98 is flexible and will be rated at 1000 p.s.i. or higher. The firearm 30 may be provided with quick connect or push fittings 100 and 102 for attaching the conduit to the housing and the cartridge, respectively. The fitting 100 may be fixed as by welding to the housing 72 over a passage 104 in the wall of the housing. The fitting 102 may be affixed to the cartridge frame 94 for convenient connection to the cartridge as it is inserted in the compartment 92. Where the housing 72 is fixed to the top of the cartridge frame 90, the conduit could take the form of a passageway formed through a block of metal forming the upper portion of the frame 94.

Referring still to FIG. 4, the blow back assembly 60 further comprises a closure member movable in the housing 72 between an open position and a closed position. In the open position, the valve opening 80 is open fluidly connecting the external pressure chamber 64 to the gas cartridge 90. In the closed position, the valve opening 80 is closed. In addition, the closure member is adapted in some manner to move in response to advancement or forward movement of the firing pin 38.

Figure 5A:
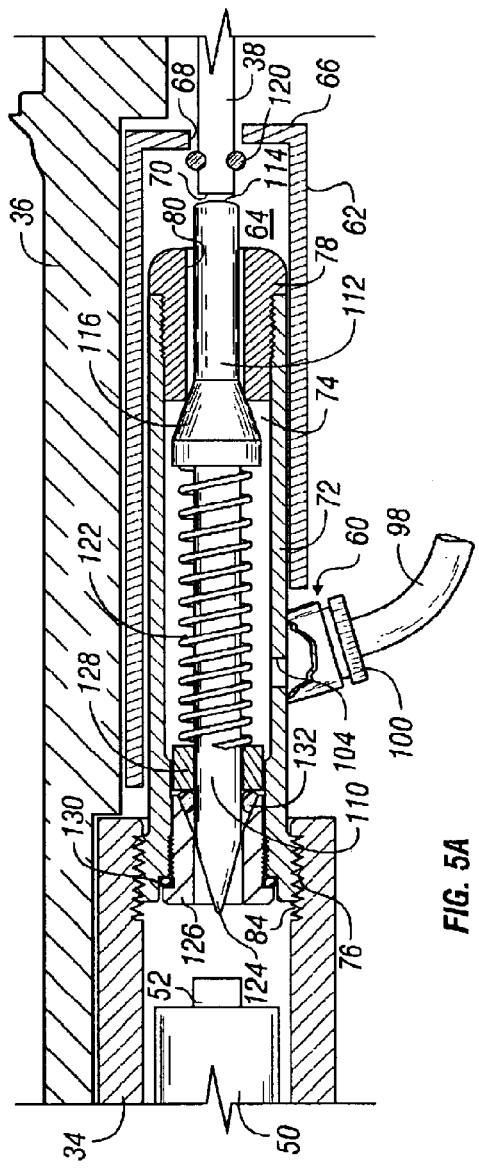
FIGS. 5A and 5B are enlarged, partly sectional, fragmented views of the pistol shown in FIG. 2 illustrating the structure and operation of the blow back assembly.
Figure 5B:
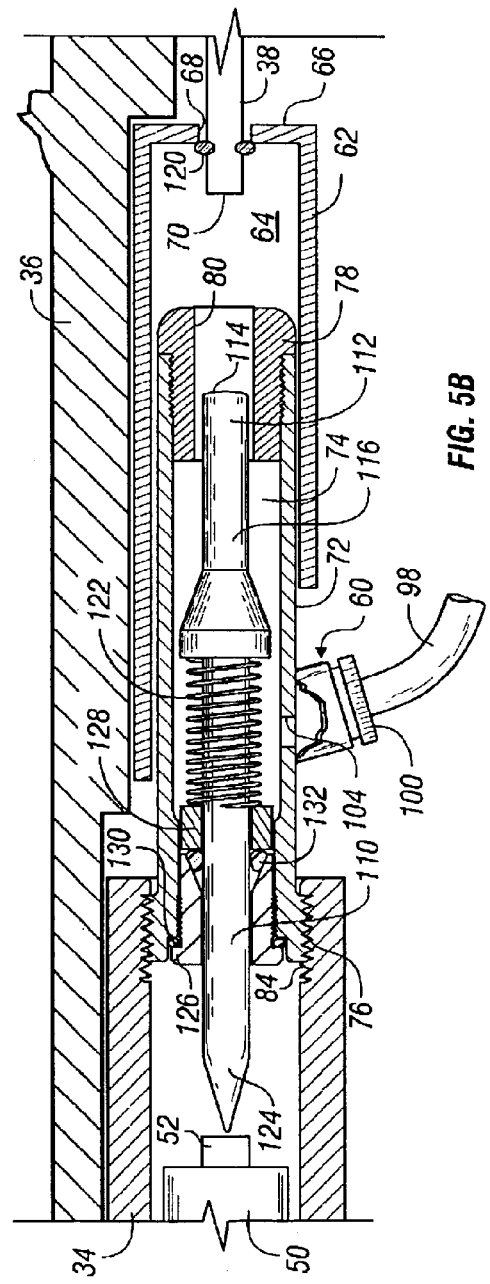

In the preferred embodiment, the closure member comprises a rod 110 movable between a rearward position, illustrated in FIG. 1, and a forward position, shown in FIG. 5B. Preferably, the rod includes a rear portion 112 comprising a rear end 114 and an enlarged portion, such as the conical section 116. The rear end 114 is sized to be extendable through the valve opening 80, and the tapered or conical section 116 is sized to seat in and thereby obstruct the forward end of the valve opening 80. Although the shape can vary, in this preferred embodiment a taper angle of 12 degrees per side, or 24 degrees included, works well.

Now it will be noted that the front end 70 of the firing pin 38 and the rear end 114 of the rod 110 are correspondingly formed so that forward movement of the firing pin causes the front end to impact the rear end of the rod, thereby pushing the rod forwardly towards the position shown in FIG. 5B. This opens the valve opening 80 and allows a rush of pressurize gas therethough. The forward end 70 of the firing pin 38 may be provided with an annular seal or check valve, such as the O-ring 120. This seal will seat in the firing pin passage 68 when the gas pushes the pin 38 and tube 62 rearwardly, as shown in FIG. 5B.

As shown in FIGS. 4, 5A and 5B, it is advantageous to bias the rod 110 in the rearward position to maintain it in a closed position keeping the valve opening closed. To that end, the blow back assembly 60 may include a coil spring 122 around the rod 110. Thus, when the advancing firing pin 38 pushes the rod forward (FIG. 5B), the spring 122 will compress. However, upon withdrawal of the firing pin 38, the spring 122 pulls the rod 110 back into the resting or closed position, shown in FIG. 5A.

As indicated above, where the laser assembly 50 is activated by a simple mechanical switch 52, it is desirable to have the blow back assembly 60 activate this switch at the same time it is recycling the weapon. To this end, the rod 110 is provided with a forward end 124 sized and positioned to impact the switch 52 when the rod is in the forward or open position, as shown in FIG. 5B. To support and align the forward end 124 of the rod 110, the housing 72 may be equipped with a plug 126 threadedly received in the front end 76 of the housing. A compression spacer 128 may be included, immediately behind the plug 126 to contain the front end of the spring 122. Seals, such as O-rings 130 and 132, may be included.

Now that the preferred structure of the training firearm 30 has been described, its operation will be explained. To the trainee, the weapon 30 will operate the same as the original, unmodified weapon. Initially, the hammer 42 is cocked for the first shot. The weapon 30 is fired by pulling the trigger 44. The trigger 44 releases the hammer 42, which in turn impacts the firing pin 38. The advancing firing pin 38 pushes forward the rear end 114 of the rod 110, opening the valve opening 80 and advancing the forward end 124 of the rod to activate the laser switch 52. Thus, simultaneously, the laser "shoots" and the gas forces back the slide 36 to recock the firearm, readying the weapon for next shot. The weapon will cycle every time the trigger is pulled until the gas supply in the cartridge 90 is spent.

The propulsive effect of the burst of gas through the valve assembly in the training pistol 30 closely simulates the feel of normal recoil in an actual weapon. However, all the components of this training weapon, including the source of compressed gas, are contained entirely within the weapon. Thus, the trainee is not encumbered by a back pack or tethered to a remote supply of gas. It is almost as easy to replace a spent gas cartridge in this training weapon as it is to replace a magazine in an actual weapon. No spent shells are expelled, which have to be retrieved and recharged. The gas cartridges used by the training firearm are so inexpensive that the modified weapon can be used for dry-firing exercises. Most importantly, the blow back assembly of this invention can be retro-fitted into an actual weapon of the same type that the trainee uses in the field. Thus, the training exercise precisely duplicates the look, feel and function of the actual weapon, including its true-to-life lock time, recoil and heft.

Changes can be made in the combination and arrangement of the various parts and elements described herein without departing from the spirit and scope of the invention as defined in the following claims.

What is claimed is:

1. A training firearm comprising:
   a receiver;
   a barrel supported on the receiver;
   a slide slidably mounted for bidirectional forward and rearward movement relative to the receiver;
   a firing pin behind the barrel, the firing pin mounted or movement between a retracted position and a firing position;
   a firing assembly comprising:
      a driver movable between a cocked position and the firing position, wherein in the firing position the driver is adapted to impact the firing pin propulsively, and wherein in the cocked position the driver is held in biased condition in preparation for release; and
      a trigger adapted to release the driver;
   wherein the slide is adapted to recock the driver when the slide moves bidirectionally; and
   a blow back assembly interposed between the barrel and the firing pin, the blow back assembly comprising:
      a tube defining an external pressure chamber,
      a housing defining an internal pressure chamber, the housing movably received in the tube, the housing having a valve opening fluidly connecting the internal pressure chamber with the external pressure chamber;
      a closure member movable in the housing between an open position in which the valve opening is open and a closed position in which the valve opening is closed, wherein the closure member is adapted to move in response to advancement of the firing pin;
      a compartment inside the firearm adapted to contain a compressed gas cartridge; and
      a conduit adapted to fluidly connect the internal pressure chamber to a th compressed gas cartridge in the compartment;
      wherein one of the tube and the housing is fixed relative to one of the receiver and the slide, and wherein the other one of the tube and the housing is fixed relative to the other one of the receiver and the slide;
   whereby, when the compressed gas cartridge is installed in the compartment, activation of the trigger causes the slide to move bidirectionally recocking the firearm.

2. The training firearm of claim 1 wherein the firearm is a pistols.

3. The training firearm of claim 2 wherein the driver is a hammer.

4. The training firearm of claim 3 her comprising a laser assembly adapted to emit a laser trigger when the trigger is activated.

5. The training firearm of claim 4 wherein the tube is fixed to the slide and has a closed rear end with a firing pin passage therethrough, wherein the firing pin has a forward end and is adapted to move reciprocally in the firing pin passage, wherein the closure member comprises a rod movable between a forward position and a rearward position, the rod having a rear end extendable through the valve opening in the housing and an enlarged portion adapted to obstruct the valve opening when the rod is in its rearward position, and wherein the firing pin is sized and positioned so that a forward movement causes the forward end to impact the rear end of the rod to push the rod forwardly to move the enlarged portion away from the valve opening.

6. The training firearm of claim 5 wherein the laser comprises a switch and wherein the rod further comprises a forward end adapted to activate the switch when the rod moves forwardly.

7. The training firearm of claim 6 wherein the rod is biased in the rearward position to maintain closure of the valve opening.

8. The training firearm of claim 7 wherein the blow back assembly further comprises a spring adapted to bias the rod in the rearward position.

9. The training firearm of claim 8 further comprising a handle supported on the receiver and wherein the compartment is inside the handle.

10. The training firearm of claim 2 further comprising a handle supported on the receiver and wherein the compartment is inside the handle.

11. The training firearm of claim 2 further comprising a laser assembly adapted to emit a laser signal when the trigger is activated.

12. The training firearm of claim 11 wherein the tube is fixed to the slide and has a closed rear end with a firing pin passage therethrough, wherein the firing pin has a forward end and is adapted to move reciprocally in the firing pin passage, wherein the closure member comprises a rod movable between a forward position and a rearward position, the rod having a rear end extendable through the valve opening in the housing and an enlarged portion adapted to obstruct the valve opening when the rod is in its rearward position, and wherein the firing pin is sized and positioned so that a forward movement causes the forward end to impact the rear end of the rod to push the rod forwardly to move the enlarged portion away from the valve opening.

13. The training firearm of claim 12 wherein the laser comprises a switch and wherein the rod further comprises a forward end adapted to activate the switch when the rod moves forwardly.

14. The training firearm of claim 13 wherein the rod is biased in the rearward position to maintain closure of the valve opening.

15. The training firm of claim 14 wherein the blow back assembly further comprises a spring adapted to bias the rod in the rearward position.

16. The training firearm of claim 13 further comprising a handle supported on the receiver and wherein the compartment is inside the handle.

17. The training firearm of claim 2 wherein the tube is fixed relative to the slide and the housing is fixed relative to the receiver.

18. The training firearm of claim 17 wherein the housing has a front end and wherein the front end is fixed to the breech end of the barrel.

19. The training firearm of claim 18 wherein the, tube is fixed to the slide and has a closed rear end with a firing pin passage therethrough, wherein the firing pin has a forward end and is adapted to move reciprocally in the firing pin passage, wherein the closure member comprises a rod movable between a forward position and a rearward position, the rod having a rear end extendable through the valve opening in the housing and an enlarged portion adapted to obstruct the valve opening when the rod is in its rearward position, and wherein the firing pin is sized and positioned so that a forward movement causes the forward end to impact the rear end of the rod to push the rod forwardly to move the enlarged portion away from the valve opening.

20. The training firearm of claim 1 whey the driver is a hammer.

21. The training firearm of claim 1 wherein the tube is fixed relative to the slide and the housing is fixed relative to the receiver.

22. The training firm of claim 1 wherein the tube is fixed to the slide and has a closed rear end with a firing pin passage therethrough, wherein the firing pin has a forward end and is adapted to move reciprocally in the firing pin passage, wherein the closure member comprises a rod movable between a forward position and a rearward position, the rod having a rear end extendable through the valve opening in the housing and an enlarged portion adapted to obstruct the valve opening when the rod is in its rearward position, and wherein the firing pin is sized and positioned so that a forward movement causes the forward end to impact the rear end of the rod to push the rod forwardly to move the enlarged portion away from the valve opening.

23. The training firearm of claim 1 wherein the conduit is flexible.

24. The training firearm of claim 1 further comprising a laser assembly adapted to emit a laser signal when the trigger is activated.

* * * * *